United States Patent [19]
Fabry

[11] Patent Number: 4,724,132
[45] Date of Patent: Feb. 9, 1988

[54] CONTINUOUS PROCESS FOR THE MANUFACTURE OF METAL SALT SOLUTIONS FROM WATER-INSOLUBLE METAL COMPOUNDS AND MINERAL ACIDS

[76] Inventor: Carl J. Fabry, 4566 W. Apopka-Vineland Rd., Orlando, Fla. 32818

[21] Appl. No.: 903,633

[22] Filed: Sep. 4, 1986

[51] Int. Cl.⁴ .......................... C01F 5/30; C01F 5/38; C01G 9/04; C01G 3/05
[52] U.S. Cl. ..................... 423/395; 423/544; 423/551; 423/554; 423/555; 423/557; 423/592; 423/604; 423/605; 423/622; 423/638; 423/639; 423/642; 423/643; 266/168
[58] Field of Search ............... 423/27, 395, 497, 605, 423/544, 551, 554, 555, 557, 592, 604, 622, 638, 639, 639, 642, 643; 75/101 R, 2; 266/168

[56] References Cited

U.S. PATENT DOCUMENTS

| | | | |
|---|---|---|---|
| 1,454,583 | 5/1923 | Goldschmidt | 423/395 |
| 1,674,077 | 6/1928 | Wild et al. | 423/395 |
| 1,771,628 | 7/1930 | Hirstel | 423/497 |
| 1,865,303 | 6/1932 | Charrier | 423/395 |
| 2,053,518 | 9/1936 | Crittenden | 423/395 |

FOREIGN PATENT DOCUMENTS 0223429 6/1985 Fed. Rep. of Germany ...... 423/497

Primary Examiner—Robert L. Stoll
Attorney, Agent, or Firm—Sughrue, Mion, Zinn, Macpeak, and Seas

[57] ABSTRACT

A continuous process for the manufacture of a metal salt solution is described which provides more economical products with higher quality than current processes. The process is safer, both to operating personnel and to the environment, than currently used processes. The process comprises feeding an aqueous metal compound slurry, e.g., a metal oxide/hydroxide slurry and a mineral acid, e.g., nitric acid, and water to a reactor which includes a zone of extreme mixing and agitation, most preferably a cross-pipe reactor provided with an optional static in-line mixer. A cross-pipe reactor provides complete and efficient reaction by providing greater surface area, high agitation and a long reaction time.

17 Claims, 1 Drawing Figure

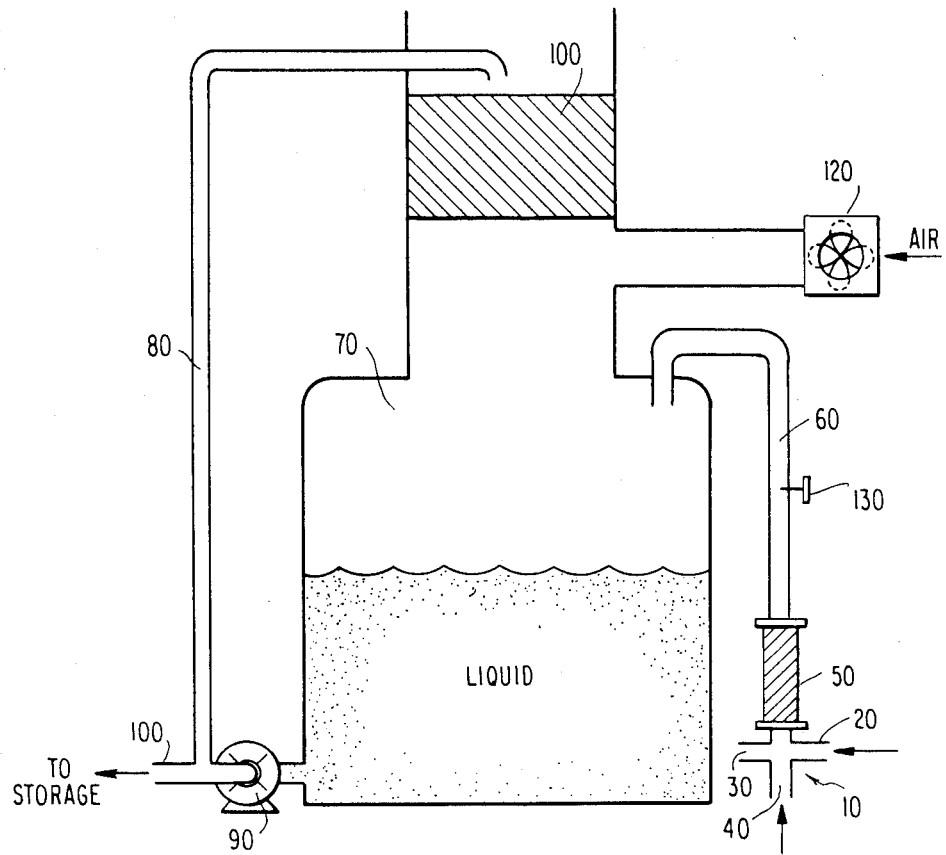

CONTINUOUS PROCESS FOR THE MANUFACTURE OF METAL SALT SOLUTIONS FROM WATER-INSOLUBLE METAL COMPOUNDS AND MINERAL ACIDS

BACKGROUND OF THE INVENTION

1. Field of the Invention

The present invention relates to a continuous process for making metal salt solutions which are particularly useful for agriculture or industry as fertilizers and industrial chemicals.

2. Description of the Prior Art

The current commercial method for making metal salt solutions is a batch process which is carried out by charging, e.g., an aqueous metal oxide/hydroxide slurry to a mixing tank equipped with an agitator and cooling means. A mineral acid, typically nitric acid, is added, slowly at first, then more rapidly toward the end of the reaction. This process is subject to a number of problems. The reaction can be violent and, on a large scale, even with good agitation and cooling, the reaction can "run away" and, in fact, at least one fatality has resulted recently from such a "run away" reaction. During the early addition of nitric acid, even if the reaction does not "run away", localized excessive heat release is often such that some nitric acid is decomposed and brown nitric oxide fumes are emitted from the reactor which can create a hazard if not properly absorbed and disposed of.

Another problem involved in the current process is that due to the slow addition of nitric acid, there is insufficient acid present in the initial part of the reaction to completely react with the metal oxide and the oxide particles become coated with nitrate salts. As a consequence, the current process provides very poor conversion of oxide to nitrate, yielding a substantial amount of sludge which must be disposed of. Since the sludge consists principally of metal oxide once nitric acid addition has ceased, there is a continued slow, variable reaction of the oxide which makes it difficult to produce a product with constant pH as is most preferred in the art.

Another problem which can also occur is over-acidulation and care must be taken in measuring the nitric acid to keep the reaction within specified limits.

U.S. Pat. No. 3,585,020 Legal, Jr. et al discloses a process for forming a free-flowing, granular, non-burning and non-crumbling 7-40-6 fertilizer composition. Reference is made at column 3 to the use of an in-line mixer. However, the use of spargers in this process suggest that it is specific to batch processing. In any case, Legal, Jr. et al is specific to forming granular materials quite different from the liquid solutions formed per the present invention.

U.S. Pat. No. 3,957,947 Yamada et al discloses a process for the continuous production of aqueous basic aluminum salt solutions. The products of Yamada appear to be deodorants, and while a short tubular reactor is involved, it is necessary to provide heat on an indirect basis and the overall reaction scheme is quite different from that of the present invention.

SUMMARY OF THE INVENTION

One object of the present invention is to provide a safe, controllable process for the manufacture of metal salt solutions which essentially eliminates the risk of a "run away" reaction.

Another object of the present invention is to provide a process that results in substantially improved conversion of raw materials to the desired products.

Still another more specific object of this invention is to eliminate the emission of environmentally harmful nitric oxide fumes that occurs in the current batch process manufacture of nitrates when nitric acid is used.

The foregoing objects can be attained by reacting an aqueous slurry of a metal compound with an aqueous mineral acid on a continuous basis in equipment which provides excellent mixing and agitation.

While the present invention is believed to be of broad application in reacting one or more water-insoluble metal compounds such as oxides, hydroxides or carbonates with one or more aqueous mineral acids to form a solution containing the corresponding one or more metal salts, it is currently contemplated that the most commercially attractive form of the present invention will involve reacting an aqueous metal oxide and/or hydroxide slurry, more commonly a aqueous metal oxide slurry, with nitric acid to form the corresponding metal nitrate.

In a most preferred embodiment, a simple and efficient system consists of a cross-pipe reactor modified by the addition of a second down-stream mixer, e.g., a conventional mechanical mixer, but most preferably a static in-line mixer following the cross-pipe reactor ports where reactants are injected.

BRIEF DESCRIPTION OF THE DRAWING

The drawing is a cross-sectional schematic view of one system for practicing the process of the present invention.

DESCRIPTION OF THE PREFERRED EMBODIMENTS

As earlier indicated, it is most preferred that a cross-pipe reactor be used to practice the present invention.

The cross-pipe reactor is known in the art and was developed for and is used to produce granular DAP or MAP. The cross-pipe reactor was developed by the Tennessee Valley Authority (TVA) and a number of configurations were attempted to achieve the objective of introducing three reactants (ammonia, phosphoric acid and sulfuric acid) into a reaction zone. It was discovered that the cross-pipe reactor provided the best results.

At least at TVA the criteria required were homogeneity of product, minimum pluggage of the cross-pipe reactor by solids and minimum corrosion of the cross-pipe reactor.

In accordance with the present invention, it has been found that the use of a cross-pipe reactor provides the best results wherein, as shown in the FIGURE, two streams are introduced in a direction essentially transverse the flow direction of a third stream so that all three streams impinge against each other. It is not overly important what reactant is introduced into which port (ports 20, 30 and 40 being shown in cross-pipe reactor 10 in the FIGURE) but it appears that the essentially opposing introduction of two streams and the perpendicular introduction of a third flowing stream provides extremely excellent efficient agitation and mixing.

In this regard it is to be noted that in the working Examples the aqueous mineral acid (hereafter often merely termed a mineral acid) and the aqueous slurry of the metal compound (hereafter often merely termed a metal compound slurry or a slurry) are introduced via ports 20 and 30 as shown in the FIGURE (or vice-versa) and water is introduced via port 40. I believe that either the acid or slurry could be introduced through port 40 and the water introduced through port 20 or port 30, but best results do appear to be achieved when the mineral acid and the slurry are introduced directly into each other along the same plane, e.g., through ports 20 and 30 as shown in the FIGURE. Further, in theory, it would not be necessary to use a port for the separate introduction of water but as a practical matter the introduction of water via a third port (in addition to ports for the introduction of the mineral acid and the metal compound slurry) permits the specific gravity of the product obtained to be so easily controlled that commercially the use of a third port in the cross-pipe reactor to permit the introduction of water is very attractive. In theory one could merely appropriately dilute the mineral acid and/or the metal compound slurry, but the use of a third port to permit the separate controlled introduction of water permits the specific gravity of the final product to be so easily adjusted as desired on a commercial scale that I believe a three port cross-pipe reactor will be the reactor of choice. In addition, introducing water in the system as was used in the working Examples permits the water to push the intimately mixed mineral acid/metal compound slurry up into the cross-pipe 60.

In the prior art DAP and MAP processes, due to the peculiarities of the reaction system involved, it was not acceptable to premix the phosphoric and sulfuric acids. Accordingly, it was necessary to achieve complete and rapid mixing by introducing the acids through pipes opposing each other and allowing the streams to impinge on each other, ammonia being introduced at a 90° angle into the area of turbulence created by the two opposing streams of acid impinging on each other. By having the two acid streams essentially meeting at the center of the cross-pipe reactor, this tends to avoid corrosion which would be caused by direct impingement of the acids on the pipe walls and, in addition, any other design would tend to lead to dead spots in the flow of reactants so that solid deposits could build up and plug the cross-pipe reactor.

While the process of the present invention takes advantages of the above aspects of the DAP/MAP process, major differences between the DAP/MAP process and the present process do, however, exist.

In the DAP/MAP process ammonia reacts with phosphoric acid and sulfuric acid instantaneously. In distinction, the metal compounds, e.g., oxides, used in the present process are water insoluble and are introduced into the reactor as solids suspended in water (slurry). As a consequence, reaction with the acid used, typically nitric acid, cannot be instantaneous and the reaction is greatly inhibited if salts from the reaction form on the surface of the oxide particles.

The DAP/MAP process involves the use of a minimum of water in the reaction system and, as a consequence, the material discharged from the reaction zone is a melt of ammonium phosphates, very little water being present, plus steam. In distinction, the processes of the present invention mandatorily requires sufficient water to dissolve the formed salts upon formation thereof.

Finally, the DAP/MAP process attempts to utilize a maximum reaction temperature whereas the process of the present invention requires reasonably close temperature control to maintain the temperature in the cross-pipe reactor and in the pipe leading from the same. In the preferred embodiment where nitric acid is used, this is below about 300° F., the temperature where nitric acid decomposition becomes significant. Temperature control where other mineral acids such as sulfuric acid or hydrochloric acid are used are less critical, and temperatures above 300° F. can be used. The main criterion is to avoid acid decomposition, and this sets the upper temperature limit of the process of the present invention.

Turning now to the most preferred embodiment of the present invention where a cross-pipe reactor is used in combination with a down-stream mixer which is a static in-line mixer, the static in-line mixer can be extremely short or, in fact, the static inline mixer could comprise the entire length of the pipe 60 as shown, in which case the static in-line mixer would essentially deliver product into receiving tank 70 and the FIGURE would be modified to basically delete pipe 60. Of course, some conventional process piping could be used. I currently contemplate that if a static in-line mixer is used the length would be at least about three times the diameter of the pipe 60 up to the entire length of the pipe 60. The primary criterion which would set the length of the static in-line mixer, if it is used, is to insure that reaction is substantially complete prior to the time the product enters the receiving tank 70 as shown in the FIGURE. Generally speaking, if the static in-line mixer (or some other mixer) is not used down-stream the cross-pipe reactor the length of the pipe 60 should be increased to insure substantially complete reaction with a decrease in the length of pipe 60 if a static in-line mixer is used. The exact length of the static in-line mixer and/or the pipe 60 can easily be determined by standard chemical engineering practices.

The excellent mixing obtained with the cross-pipe reactor creates a greater slurry/acidulation surface area, and insures good conversion of metal compound(s) to metal salt as shown with a cross-pipe reactor in which conversions were significantly better than with the conventional prior art batch process. Acidulation is, of course, the process of adding acid, and generally the amount of mineral acid, normally nitric acid, is specified with respect to the amount of metal compound, typically an oxide. This can easily be established by one skilled in the art.

As indicated, even more pronounced effects are obtained with the addition of a static in-line mixer downstream from the cross-pipe reactor. A typical static in-line mixer useful in the present invention and, in fact, the one that has been used to date, is disclosed in U.S. Pat. No. 4,093,188 Horner, hereby incorporated by reference. The particular static in-line mixer disclosed has stationary baffles providing sinuous, non-parallel spiraling flow paths to promote thorough and homogeneous intermixing of fluids. It is not mandatory to use that precise static in-line mixer and other static in-line mixers, also known as stationary baffle mixers or interfacial surface generators, can be used. For example, I am confident that stationary baffle mixers or interfacial surface generators as disclosed in U.S. Pat. Nos. 3,190,618; 3,620,506; 3,643,927; 3,652,061; 3,923,288; 3,947,939 and Reissue No. 28,072 could be used with equal success, and all of these patents are also incorporated by reference.

I wish to emphasize that I am confident that other mixers could be used instead of a static in-line mixer, for example, as can be appropriately selected by one skilled in the art from the *Chemical Engineers' Handbook,* John H. Perry, Editor, Third Edition, McGraw-Hill Book Co., Inc., pp. 1195-1231. I contemplate a high velocity impeller mixer, preferably a multiple impeller mixer, as potentially especially useful, though my experience to datee has been with the static in-line mixer.

The actual configuration of the cross-pipe reactor in accordance with the present invention, specifically the configuration of the pipe and the entry ports, is less critical then in the DAP/MAP process, but good mixing and prevention of corrosion/erosion are important factors, and for this reason while the use of cross-pipe reactor is not mandatory, it is highly preferred.

With respect to the concept of creating a relatively high oxide slurry/acidulation surface area, I currently believe that this is important since the high degree of mixing/agitation attained should provide exposed metal compound surfaces on the slurry particles in the reaction zone for the acid to attack by rubbing off deposited or formed salts.

In this regard, it is impossible to quantify extreme mixing and agitation with exact precision, but the key objective is to insure that the desired salt formed on the slurry particles is removed so that fresh metal compound, e.g., oxide, is exposed so that it can continue to complete reaction. Thus, one seeks a turbulent, tumbling action which exposes new metal compound surface area for reaction to the desired salt.

It is important to note that since the present invention is directed to a continuous process, the proper amounts of metal compound and mineral acid can be rapidly mixed to insure complete reaction but, as opposed to a large commercial scale batch process, the quantities of mineral acid and metal compound being rapidly mixed are relatively small so that the danger of a "run away" reaction is avoided.

The most preferred embodiment of a continuous process of the present invention will be described with reference to the FIGURE where a metal oxide, e.g., magnesium oxide, as an aqueous slurry is reacted with a mineral acid, e.g., nitric acid, with water being added to adjust specific gravity.

The metal oxide slurry is pumped into port 20 of the cross-pipe tee 10, the mineral acid is pumped to port 30 and the water is pumped into port 40. Reaction begins on contact of the metal oxide and mineral acid and the mixture of the reactants is forced substantially immediately into the static in-line mixer 50 where reaction continues to occur. The rate of total feed is controlled so that the temperature as taken about midway up the pipe 60 above the in-line mixer 50 is maintained at about 250° F. ±50° F. Generally speaking, reaction continues in the pipe 60. Since the reaction of the present invention is exothermic, external heat need not be supplied to the system. As a general practice, I simply measure the temperature about one-half way up the distance of the pipe 60 as shown in the FIGURE by temperature indicator 130. Temperature could easily be measured anywhere between the cross-pipe reactor and discharge into the receiving tank 70 as shown in the FIGURE. My expectation is that if temperature were measured just above the cross-pipe mixer it would be somewhat less than the temperature at a higher location since heat does rise, but as the main criterion used to set the temperature is to avoid acid decomposition, the exact location of the temperature sensor is not an overly important point in the system of the present invention.

The ratio of slurry to mineral acid fed is adjusted to maintain product pH specification at the desired various levels, depending on the type of product being manufactured. The rate of water addition is controlled to maintain the desired product specific gravity. Product specific gravity is a relatively precise number and is typically set by the tolerances of fertilizer control laws. It can be freely selected by one skilled in the art.

After the reactants have passed through the cross-pipe reactor 10, the mixer 50 and pipe 60, the reacted mixture is conveniently discharged into a receiving tank 70. Generally, I prefer to substantially complete reaction prior to introduction of the product into the receiving tank 70. As one skilled in reaction kinetics will appreciate, there will be some slight amount of reaction in the receiving tank 70, but this is not of consequence if any reasonable amount of care is exercized over process control, as would be apparent to a chemical engineer. The discharge is usually above the level of the liquid in the receiving tank 70 in order to achieve faster cooling. If the discharge is below the liquid level, reducing to some degree the cooling capacity, the conversion ratio from metal oxide to salt is slightly improved. As will be appreciated by one skilled in the art, the use of a receiving tank is merely a convenient means to use a cool, large mass of product to inexpensively cool the product received from pipe 60. Any conventional means could be used to achieve this cooling effect, and a receiving tank is merely set forth as what I currently contemplate to be the most economical means of achieving this effect, i.e., cooling by introducing a relatively small volume of a hot chemical product into a much larger mass of cool chemical product.

Obviously the determination of optimum reaction parameters will be well within the skill of the chemical engineer. The product can be recirculated from receiving tank 70 through cooling means (not shown) via pump 90. If desired, some product can be sent to storage via line 100 but normally the greater volume is recirculated over a packed column 110 through which air is blown by fan 120 in order to cool the product prior to storage.

Any conventional packing means which provides sufficient surface to achieve the desired evaporative cooling effect can be used which is resistant to the product. Such can be freely selected by a chemical engineer. As should be apparent to one skilled in the art, the use of a packed column or the equivalent is optional but it does permit the product to be cooled more rapidly. For example, if one were forming product at the rate of 1,000 gallons per hour, one would typically recirculate 300 to 400 gallons per minute of product through the packed column 110. This is entirely non-limitative on the present invention.

As one skilled in the art will appreciate, obviously pumping means are provided throughout the system as needed; these are conventional and are not shown.

Further, as will be apparent to one skilled in the art, since a mineral acid is being used obviously conventional process equipment resistant to acidic conditions will be used, typically stainless steel.

In the practice of present invention, a wide variety of metal compounds may be used. For example, oxides sources may be used, including magnesium oxide/hydroxide, calcium oxide/hydroxide, zinc oxide/hydroxide, manganese oxide/hydroxide, copper oxide/hydroxide, potassium hydroxide and other metal oxides. Also the carbonates of these metals can be used in the process with good success.

While the use of nitric acid in the instant invention provides the most useful products, other acids can be used in the process, for example, sulfuric acid, hydrochloric acid or other strong acids or mixtures of acids which will react with, e.g., the metal oxides, hydroxides or carbonates yielding stable salts.

The desired product is, of course, the salt of the acid and the metal, e.g., with nitric acid and a magnesium compound, mangesium nitrate.

While there is no reason why a plurality of metal compounds and/or mineral acids could not be reacted, to date commercial interest has not been overly great in such more complicated products.

Acid concentration or strength is not overly important so long as there is sufficient acid to insure reaction with the metal compound to form the desired salt during the course of the reaction. At present, it is contemplated that commercially available mineral acids will generally be used, for example, nitric acid having a concentration of about 55 to about 60 wt. %, sulfuric acid having a concentration of about 94 to about 98 wt. % wt. %, hydrochloric acid having a concentration of about 40 to about 45 wt. %, etc can be used. So long as the acid is sufficiently strong to react with the metal compound(s) to form the desired salt(s), the major criterion that sets the acid concentration is cost.

I generally prefer to use a slurry having about a 30 to about 60% by weight solids content of the metal compound (based on slurry weight), though this is not limitative and, generally speaking, the percent solids in the slurry is as high as possible since this reduces the amount of labor involved, the amount of material that must be mixed and transportation costs. However, the solids content cannot be so high that the slurry is not pumpable, i.e., the slurry should not be too viscous so that, for example, it might set up during storage. Since I generally contemplate the use of commercially available metal compound slurries, usually 30 to 60% solids by weight, more commonly 40 to 60% solids by weight, will be used.

With respect to slurry particle size, generally speaking the finer the slurry particle size the better since this will permit the slurry particles to be more easily suspended with less agitation and, in addition, the finer the slurry particle size, the greater the surface area which is exposed for reaction with the mineral acid. Typically the solids in the slurry will have a size which will pass 100 mesh but will be retained on 400 mesh, and generally I prefer to use materials which pass 325 mesh (100%).

It should be noted that various conventional additives can be present in the reaction system so long as they do not interfere with the reaction or promote some useful effect. For example, suspending agents are often present in commercially available slurries.

Turning to the process parameters of the present invention in more detail insofar as pressure, temperature and time are concerned, the working pressure is of little or no importance to the process of the present invention and is typically near atmospheric.

Temperature, however, is probably the most important process parameter and will typically be on the order of about 150° to about 350° F. These limits are not absolutely critical, but at temperatures significantly below about 150° F. the reaction rate tends to slow and become commercially unattractive. The upper temperature limit is more important if nitric acid is used since this is about the limit of major nitric acid decomposition and temperature should be fairly closely watched. As earlier indicated, for other acids the upper temperature can be somewhat higher. More preferably, the temperature is in the range of about 210° to about 270° F., and most preferably the temperature is 240° to 260° F.

It is my current feeling that the time of reaction should be on the order of about 1 second to about 30 minutes, preferably 30 seconds to 15 minutes, and most preferably 2 to 6 minutes. I have not performed runs over the entire range described, but believe that the above ranges should include most useful times.

While not a process parameter in the sense of pressure, temperature or time, pH is important since the end user or government regulations will generally specify the pH required in the final product obtained in accordance with the process of the present invention. Thus, realistically, temperature and pH are the two most important process parameters in the process of the present invention. pH is basically controlled by increasing or decreasing the amount of mineral acid introduced (the more acid, the lower the pH, the lesser the amount of acid, the greater the pH) or, of course, by keeping the amount of mineral acid constant and increasing or decreasing the amount of metal compound slurry which will, of course, have an effect exactly opposite that of increasing or decreasing the amount of mineral acid and keeping the amount of metal compound slurry constant. If water is separately added this will, of course, have some slight effect on the pH and temperature, but generally speaking the ratio of mineral acid to metal oxide slurry will be the most important factor in setting the pH.

Normally what I do in practicing the process of the present invention to form a new product, i.e., one where I have not run the process before, is to set the amount of metal compound slurry. The mineral acid line is then opened and I monitor the temperature of the process so that the desired temperature is obtained, e.g., 250° C. I then monitor specific gravity and typically adjust the specific gravity by varying the amount of water introduced into the combined mineral acid/metal compound slurry mixture. Typically I use the rate of mineral acid addition to control the pH to the desired value though, as indicated, I can equally as well do this by setting the mineral acid flow constant and adjusting the metal oxide slurry flow. Essentially what I normally do is adjust the mineral acid flow (or the metal compound slurry flow) and chase the reaction until I reach the desired optimum conditions.

The pH of a product formed by the process of the present invention can vary widely. For example, since the current preferred area of use is as a fertilizer, the pH will vary depending upon the agronomics, the soil involved and the crop involved. Typically pH will vary from about 1 to about 8, more generally from 5 to 7, and at current most products that I have formed have a pH of about 6 to about 7.

Specific gravity will depend upon end user requirements. This is not limitative, but for most commercial products will be from about 1.2 to about 1.45 (corresponding to 10 pounds to 12 pounds per gallon).

Typical final products formed per the process of the present invention include a 63.3% concentrated solution of magnesium nitrate which can be used as a direct application foliar, fertigation or soil applied material or can be added to liquid fertilizer, applied separately, or used as a carrier for most pesticides and spray materials except phosphatic compounds. It is a cost effective, soluble magnesium source and is directly taken up by plant roots or leaves, with greater efficiency than any other source of magnesium. It contains 100% nitrate nitrogen, which is fully available to the plant. It has a specific gravity at 60° F. of 1.34, a salting out temperature of 32° F., a viscosity, centipoises at 60° F. (Brookfield) of 20–30, a pH of 6.5 and is water white.

Another product is a 71% concentrated solution of magnesium nitrate for industrial and agricultural use. It can be used as a liquid fertilizer either as a foliar, fertigation or soil applied material, or as a carrier for most pesticides and spray materials except, phosphatic compounds and industrially can be used as a reagent material for magnesium and nitrate compounds, in catalyst manufacture, in the ceramic industry, for metal cleansing and etching, for thermal energy storage applications and in the textile industry. It has a specific gravity at 60° F. of 1.36, a salting out temperature of 50° F., a viscosity, centipoises at 60° F. (Brookfield) of 30–40, a pH of 6.5 and is water white.

In order that those skilled in the art may better understand the invention, the following Examples and Comparative Examples are provided for illustration and are not provided for illustration and are not limiting in any way.

COMPARATIVE EXAMPLE 1

Into a 55 gallon stainless steel drum outfitted with an electric driven lightening propeller-type mixer was charged 127 pounds of water and 57 pounds of commercial magnesium oxide typically containing 97.5% MgO, duplicating the standard batch process method of oxide to nitrate conversion. The mixture was stirred vigorously for on the order of 10 minutes to obtain a uniform slurry and then the addition of 316 pounds of 55% nitric acid was started using a small variable speed metering pump. The rate of addition of acid was maintained as fast as possible without causing vigorous boiling of the water. During addition of about the first 150 pounds of acid, brown nitric oxide fumes were evolved continuously from the mixture. When most of the calculated amount of nitric acid had been added and no further heat was being generated the pH was adjusted to 6.5 and the mixture allowed to settle and clarify overnight. The next day the nearly clear supernatant liquid was decanted and it was found that both the pH and specific gravity were higher than specifications, due to further slow reaction of the MgO overnight and to the loss of water by vaporization, respectively. Nitric acid and water were added to bring the product to specifications. The wet cake of residue was dried and found to weigh 11.4 pounds. Ignoring impurities, the conversion of oxide to nitrate was calculated as $(57-11.4/57)\times 100 = 80\%$.

EXAMPLE 1

A run was carried out using equipment as shown in the FIGURE but not including any special mixing device, i.e., an open cross-pipe reactor without a static in-line mixer. In the Examples herein the runs were on a laboratory scale using a cross tee reactor where the ports had an inner diameter of about ¼ to about ½" and the pipe was 36" in length having an inner diameter the same as the cross tee reactor ports. Obviously these dimensions are not restrictive and smaller and/or larger devices can be used. All process lines were stainless steel. Reactants were pumped into the cross-pipe injection ports as follows: A slurry of magnesium oxide containing 40% solids (pass 325 mesh/retained on 400 mesh) and 60% water at a rate of 1.6 pounds per minute (port 20), 55% nitric acid at a rate of 3.5 pounds per minute (port 30) and water at a rate of 0.5 pounds per minute (port 40). The reaction product was simply flowed into a receiving tank above the liquid level for ease of operation. During the run frequent samples were taken from the tank for pH and specific gravity checks, and nitric acid and water flows were adjusted to maintain these values at the desired levels, i.e., pH 6.5, specific gravity 1.36 (these values are the same in the following Examples unless indicated to the contrary). Acidulation and conversion were thus controlled. During the run the temperature at the midpoint of the pipe fluctuated from 210° F. to 240° F. and a small puff of brown nitric oxide fumes was occasionally emitted from the reactor. After the run had reached steady state operation, a 5 gallon sample was withdrawn from the tank and let stand overnight to clarify. The next day, supernatant liquid was decanted and pH and specific gravity checked. Addition of nitric acid to lower the pH was performed and specific gravity was satisfactory. The wet cake of magnesium nitrate was dried and based on its weight of 0.65 pounds, a conversion of 90% for oxide to nitrate was calculated.

EXAMPLE 2

A run was carried out using equipment as shown in the FIGURE including a static in-line mixer as disclosed in U.S. Pat. No. 4,093,188 Horner. It is commercially available under the tradename STATA-TUBE and is a motionless mixture manufactured by TAH Industries, P. O. Box 178, Imlaystown, N.J. 08526, (2" I.D.×24" length). Feed rates were the same as Example 1. Samples were taken from the tank as in Example 1 for pH and specific gravity checks and nitric acid and water flows adjusted accordingly. Acidulation and conversion were precisely controlled. It was noted that the temperature at the midpoint of the pipe fluctuated only between 235° F. and 240° F. and no brown nitric oxide fumes were emitted. A 5 gallon sample was taken during steady state operation and clarified overnight. The supernatant liquid was decanted the next day and a pH check showed the product did not require any additional nitric acid. A small amount of magnesium wet cake was dried and based on its weight (0.2 pound), a conversion of oxide to nitrate of 97% was calculated $(6.5-0.2/6.5)\times 100 = 97\%$.

EXAMPLE 3

A run similar to Example 2 was carried out with the feed rates doubled. The temperature at the midpoint of the pipe ranged from 255° F. to 260° F. and an infrequent small puff of brown nitric oxide was noted. The conversion of magnesium oxide to magnesium nitrate was calculated as 98%.

EXAMPLE 4

A run similar to Example 2 was carried out with a slurry of zinc oxide substituted for magnesium oxide. The feed rates were 2.1 pounds per minute of zinc oxide slurry (40% solids), 2.4 pounds per minute of 55% nitric acid and 1.1 pounds per minute water. The temperature in the pipe was about 235° F., no brown fumes were emitted and the conversation of zinc oxide to zinc nitrate was 99% (calculated).

EXAMPLE 5

A run similar to Example 2 was carried out with a slurry of manganese oxide substituted for magnesium oxide. The feed rates were 2.1 pounds per minute of manganese oxide slurry (40% solids), 2.6 pounds per minute of 55% nitric acid and 1.1 pounds per minute water. The temperature in the pipe was about 270° F., occasional brown fumes were emitted and the conversion of manganese oxide to manganese nitrate was 93% (calculated).

EXAMPLE 6

A run similar to Example 2 was carried out with a slurry of copper oxide substituted for magnesium oxide. The feed rates were 2.1 pounds per minute of copper oxide slurry (40% solids), 2.3 pounds per minute of 55% nitric acid and 1.1 pounds per minute water. The temperature in the pipe was about 250° F., no brown fumes were emitted and the conversion of copper oxide to copper nitrate was 99% (calculated).

EXAMPLE 7

A run similar to Example 2 was carried out with a slurry of calcium hydroxide substituted for magnesium oxide. The feed rates were 2.1 pounds per minute of calcium hydroxide slurry (40% solids), 3.0 pounds per minute of 55% nitric acid and 1.1 pounds per minute water. The temperature in the pipe was about 250° F., no brown fumes were emitted and the conversion of calcium hydroxide to calcium nitrate was 95% (calculated).

While there have been described what are at present considered to be the preferred embodiments of this invention, it will be obvious to those skilled in the art that various changes and modifications can be made therein without departing from the invention, and it is, therefore, intended to cover all such changes and modifications as fall within the true spirit and scope of the invention.

What is claimed is:

1. A continuous process for manufacture of an aqueous metal salt solution wherein the metal salt is a salt of a metal selected from the group consisting of magnesium, calcium, zinc, manganese, copper, potassium and mixtures thereof with an acid selected from the group consisting of concentrated sulfuric acid and concentrated nitric acid, which comprises continuously injecting at least one aqueous slurry of particles of a water-insoluble metal compound selected from the group consisting of a magnesium oxide, magnesium hydroxide, calcium oxide, calcium hydroxide, zinc oxide, zinc hydroxide, manganese oxide, manganese hydroxide, copper oxide, copper hydroxide, potassium hydroxide, magnesium carbonate, calcium carbonate, zinc carbonate, manganese carbonate, copper carbonate, potassium carbonate and mixtures thereof and a mineral acid selected from the group consisting of concentrated sulfuric acid and concentrated nitric acid into a zone of extreme mixing and agitation to form a mixture thereof and react the same to said metal at a temperature of at least about 150° C., and thereafter continuously removing the resulting mixture from the zone, wherein the extreme mixing and agitation is to a degree such that when metal salt is formed on a particle of the water-insoluble metal compound, it is removed so that fresh water-insoluble metal compound is exposed so that reaction can be completed to said metal salt, wherein the extreme mixing and agitation is accomplished by means of a cross-pipe reactor wherein the aqueous slurry of the particles of the water-insoluble metal compound and the concentrated nitric acid or concentrated sulfuric acid are introduced into a zone perpendicular to each other to thereby obtain the zone of extreme mixing and agitation.

2. The process of claim 1, wherein the aqueous slurry of the water-insoluble metal compound and the concentrated mineral acid are introduced into the cross-pipe reactor into the zone of extreme mixing and agitation along the same plane but from opposite directions from each other.

3. The process of claim 2, wherein water is further introduced into the zone of extreme mixing and agitation.

4. The process of claim 3, wherein the water is introduced into the cross-pipe reactor into the zone of extreme mixing and agitation in the direction perpendicular to the aqueous slurry of a water-insoluble metal compound and the concentrated mineral acid.

5. The process of claim 4, wherein after the zone of extreme mixing and agitation the resulting mixture is passed into a static mixer which provides sinuous, nonparallel spiralling flow paths which promotes thorough and homogeneous mixing.

6. The process of claim 5, where the temperature of reaction is about 150° F. to about 350° F.

7. The process of claim 6, where the pH is maintained in the range of about 1 to about 8.

8. The process of claim 5, where the pH is maintained in the range of about 5 to 7.

9. The process of claim 7, where the specific gravity of the metal salt solution is about 1.2 to about 1.45.

10. The process of claim 9, where the aqueous metal compound slurry comprises about 30 to about 60% by weight of the slurry of the water-insoluble metal salt compound.

11. The process of claim 10, where the water-insoluble metal compound has a particle size of about 100 to about 400 mesh.

12. The process of claim 1, wherein:
   (i) the extreme and agitation is accomplished by means of a cross-pipe reactor wherein the aqueous slurry of the particles of the water-insoluble metal compound and the concentrated mineral acid are introduced along the same plane but from opposite directions from each other to thereby obtain the zone of extreme mixing and agitation;
   (ii) water is further introduced into the cross-pipe reactor and into the zone of extreme mixing and agitation in a direction perpendicular to the aqueous slurry of the water-insoluble metal compound and the concentrated mineral acid;
   (iii) after the zone of extreme mixing and agitation the mixture is passed into a static mixer which provides sinuous, nonparallel spiralling flow paths which promote thorough and homogenous mixing:
   (iv) the temperature of reaction is about 150° F. to about 350° F.;
   (v) the pH is maintained in the range of about 1 to 7:
   (vi) the aqueous slurry of the particles of the water-insoluble metal compound comprises about 30 to 60% by weight of the slurry of the particles of the water-insoluble metal compound;
   (vii) wherein the mineral acid is concentrated nitric acid and the water-insoluble metal compound is selected from the group consisting of magnesium oxide, zinc oxide, manganese oxide, copper oxide and calcium hydroxide; and (viii) the specific gravity of the aqueous metal salt solution is about 1.2 to about 1.45.

13. The process of claim 1, wherein the mineral acid is nitric acid and the water-insoluble metal compound is magnesium oxide.

14. The process of claim 11, wherein the nitric acid has a concentration of about 55 to about 60 wt. % and the sulfuric acid has a concentration of about 94 to about 98 wt. %.

15. The process of claim 13, wherein the nitric acid has a concentration of about 55 to about 60 wt. %.

16. The process of claim 12, wherein the water-insoluble metal compound has a particle size of about 100 to about 400 mesh.

17. The process of claim 16, wherein the nitric acid has a concentration of about 55 to about 60 wt. %.

* * * * *